United States Patent [19]

Gage

[11] Patent Number: 4,539,590

[45] Date of Patent: Sep. 3, 1985

[54] METHOD AND APPARATUS FOR PROCESSING OPTICAL TRACKING SIGNALS

[76] Inventor: Richard J. Gage, 1500 NE. Malabar Blvd., Palm Bay, Fla. 32905

[21] Appl. No.: 473,225

[22] Filed: Mar. 8, 1983

[51] Int. Cl.³ .............................................. H04N 7/18
[52] U.S. Cl. .................................... 358/125; 358/107; 358/282
[58] Field of Search ................ 358/125, 126, 107, 282

[56] References Cited

U.S. PATENT DOCUMENTS

| | | | |
|---|---|---|---|
| 3,444,380 | 5/1969 | Webb | 358/125 |
| 3,586,770 | 6/1971 | Bonebreak | 358/125 |
| 3,947,628 | 3/1976 | Alien | 358/125 |
| 4,133,004 | 1/1979 | Fitts | 358/125 |
| 4,314,276 | 2/1982 | Woolfson | 358/125 |
| 4,345,314 | 8/1982 | Melamud | 358/282 |
| 4,385,318 | 5/1983 | Miller | 358/282 |

Primary Examiner—Howard W. Britton
Attorney, Agent, or Firm—MacDonald J. Wiggins

[57] ABSTRACT

In an optical tracking system utilizing a TV camera, a method and apparatus for effectively removing the background of the scene and passing only target information to the tracking system. The analog video signal from the camera is converted to a 6-bit byte digital bit stream and top and bottom scanning lines representative of the background are stored. Scanning lines containing target data are compared to the stored lines and are converted to a serial digital bit stream having a ZERO base line representative of the background and variable width ONEs representative of the target. The centroid of the target is calculated and utilized to generate a tracking error between the centroid and the camera boresight.

4 Claims, 15 Drawing Figures

PIXEL GRAY SCALE

LINE 72: 51+52+53+66+67+68 = 357
LINE 71: 51+52+53+54+64+65+67 = 406
LINE 70: 50+51+52+53+54+63+64
+65+66+67 = 585

FIG. 14

METHOD AND APPARATUS FOR PROCESSING OPTICAL TRACKING SIGNALS

BACKGROUND OF THE INVENTION

1. Field of Invention

The present invention relates to pattern recognition systems and more particularly to apparatus for identifying and removing backgrounds from a video image of a moving target in an optical tracking system.

2. Description of the Prior Art

It is well known in the prior art to track moving objects sush as aircraft, vechicles, and the like by means of optical systems. Commonly, a video camera, which may be sensitive to visible light or infrared energy, will be aimed at a scene containing the object to be tracked. The scene may be displayed on a cathode ray tube. The video signal from the camera may be processed to produce an electronic tracking gate which controls a servo mechanism system coupled to the camera platform. The electronic tracking circuits thereby control the platform position and attitude to maintain the targets centered within the electronic gate. The display system permits initial manual tracking of the target prior to switching to the automatic mode. Such systems have many uses including tracking a target prior to launching of a missile or the like; for use within a missile for tracking and guidance of the missile into a target; and for controlling missiles after launch from the launch vehicle or from a ground location. In noncombat applications, tracking systems of this type may be used during testing of missiles, vehicles, aircraft and the like to provide bearing and velocity information to a ground monitoring station.

In all of these applications of optical tracking systems, one inherent problem obtains from variations in the backgound of the target. For example, as the object being tracked moves from a dark background, such as would be typical of trees, into a very light area such as a sky or clouds, the sharp changes in contrast in the video scene may be interpreted by the tracking system as a target movement causing the tracking window to slew off and lose lock. This action often results in complete loss of target with resultant failure of the mission. Thus, there is a need for means to discriminate between the target and the background in video tracking systems. For example, if the background portion of the video pattern may be recognized and identified as background, all video information from such background may be deleted from the electronic tracking circuits. Therefore, abrupt changes and contrasts of background would not interfere with the tracking process.

In U.S. Pat. No. 3,444,380, Webb teaches a method and apparatus for suppressing the background in a field scanning sensor. The method utilizes digital space correlation to suppress false target signals as applied to a point target tracking device. The search field of a tracking system is divided into a matrix of rows and columns of elemental fields of view. Each elemental field view is examined to determine if a target exists in that field and matrix neighbors are compared to determine if target signal exist in adjacent elemental fields. The system rejects a signal if its adjacent matrix neighbor contains a signal.

U.S. Pat. No. 3,586,770 to Bonebreak et al discloses a system for distinguishing a specified object in space from objects of similar intensity within a receiving aperture of a television camera. In this patent, a video processor is coupled to the television camera and limits the system response to signals representative of the inner intensity contour of possible targets. A digital processor responds to the video processor output signals to determine the difference between the angular location of the designated object and a previously stored estimate of this position and then updates the stored position. The updating function is normalized by the target image dimension so that the tracking response of the system is essentially independent of the target image size. The video processor unit eliminates signals which are not representative of a designated target on the basis of signal amplitude comparisons. Digital logic circuits distinguish between the design target and false targets on the basis of angular location.

Neither of these prior art approaches provides an effective and efficient means for removing a background signal from a video image containing a moving target. The use of amplitude discrimination results in loss of sensitivity in the presence of noise.

SUMMARY OF THE INVENTION

The present invention provides a system for background removal and pattern recognition when used with a television camera as the sensor of a video tracking system which does not depend upon amplitude discrimination. The television camera for the tracking system has its video output connected to an analog-to-digital converter (A/D converter). The A/D converter produces a digital word or byte representative of a shade of gray for each pixel in each scanning line. The number of bits per byte is a function of the gray scale resolution desired; however, a 6-bit byte will generally give sufficient resolution. As the TV field is scanned, the digital bit stream output from the A/D converter will be understood to contain a large number of bytes representative of background pixels and smaller a number of bytes representative of the target moving across the background. The invention processes or screens these bytes to effectively reject pixels forming the backgound and pass only target pixels. In addition, the system converts the parallel digital video signal from the A/D converter to a serial digital video bit stream having a sequence of varying pulse width ones representative of the target with the background being expressed as the ZERO base line. As is to be understood, the invention in effect completely removes contrast as a parameter for a tracking system.

A tracking gate or rectangular window is generated by the associated tracking system which would be centered on the operator's TV display. The tracking system maintains a target within this gate as the target is tracked. In the system of the invention, the bytes representative of the pixels of the scan line representing the top of the gate are stored in a top memory, and the scan line representative of the bottom of the gate is stored in a bottom memory. As will be understood, these two memories are maintained for the duration of a single field. When the next field occurs the respective memories will be refreshed. Since these lines are near the top and bottom portions of the frame, only background information will be present therein since the target is assumed to be essentially centered in the tracking gate.

As the digital video bit stream from the A/D converter continues from the top gate line to the bottom gate line, the parallel pixel digital bytes are compared, in a background comparator circuit, with the top line stored bytes and the bottom line stored bytes from the memories. The time from the top gate line to the bottom gate line is referred to hereinafter as the "stripping time". Each pixel on the stored top and bottom lines is compared with each pixel that falls within the stripping time. It is also to be understood that the pixels are to be compared only for the same relative vertical field time.

When a comparison between a top line pixel and a pixel in the stripping area is found to have the same value, then a ZERO having the duration of the pixel is passed. If the value of the pixel in the stripping time area is larger than the stored pixel being checked then the output will be considered pure white and a ONE having the duration of a pixel is output. If the value is smaller, then that pixel will be considered a pure black pixel and a ZERO output. This determination is made in a decoder. The decoder therefore produces no output when a pixel in the stripping time is equal to the corresponding pixel in either top stored line or the bottom stored line. However, if there is a difference from either one then this is indicative that the pixel represents an object different from the background and therefore a ONE output will occur. It may now be seen that the original 6-bit byte digital video signal having background information has been converted to a serial digital bit stream having varying width ONES defining target pixels and a ZERO base line in lieu of backgound information. The serial digital bit stream is fed to a two line correlator which examines two consecutive horizontal lines and will output a signal only if the same incoming data appears in two consecutive lines for the same relative position. The correlator serves to remove random noise pulses and to pass signals representative of the target.

A frame memory is provided which receives the information passed by the two line correlator. Thus, this memory will store the serial digital bit stream generated for each TV frame which is different from the background and which appears on two consecutive lines.

When the target being tracked is moving relatively slowly, the position of the target relative to the background will show little change. In such instance, the information in the frame memory may be recirculated for a time proportional to the velocity until the object moves to a new position against the background. To this end, a velocity sampling switch is provided to switch from a recirculated condition of the frame memory to an updating condition of the frame memory. The processed bit stream is thereafter read from the frame memory to the tracking system with the velocity determined from the system error signal. The processed bit stream from the memory is input to a centroid calculator which generates an error signal which is applied to the servo system for controlling the camera platform to minimize the positional error.

It is therefore a principal object of the invention to provide a digital processing system which will essentially remove the video background in a video tracking system in which a target is being tracked and which moves across such background to thereby eliminate contrast as a criterion for target recognition.

It is another object of the invention to provide a system which will digitize the analog video signals from a television camera, will define a stripping time in the TV field in which time the moving target will occur, and will compare pixels within such stripping time with stored background pixels to identify pixels representative of the background and pixels representative of the moving target.

It is still another object of invention to process pixel elements in the stripping time so as to pass only such elements representative of a moving target.

It is yet another object of the invention to store pixels in a TV frame representative of a moving target and to read such pixels out to the tracking electronics of the system thereby providing a TV field having a moving target represented without a background.

These and other objects and advantages of the invention will become apparent from the following detailed description when read in conjunction with the drawings.

DETAILED DESCRIPTION OF THE PREFERRED EMBODIMENT

The invention is to be used with prior art optical tracking systems of the type utilizing a television camera. Before describing the preferred embodiment, it is pertinent to define certain parameters with reference to FIG. 1. One field 10 of a sequence of frames of a typical TV system is shown. It is assumed that a conventional field is used having a plurality of sequential horizontal scan lines 12 with the vertical resolution of a picture determined by the number of lines 12 per field and that a pair of interlaced fields form a frame. The horizontal resolution is determined by the number of picture elements 14, referred to as pixels. It is to be understood that the number of pixels 14 and horizontal lines 10 in a practical system will be much greater than shown in the simplified example of FIG. 1. For example, each scan line may comprise 240 active pixels and 240 active lines may form a field.

Figure 1:
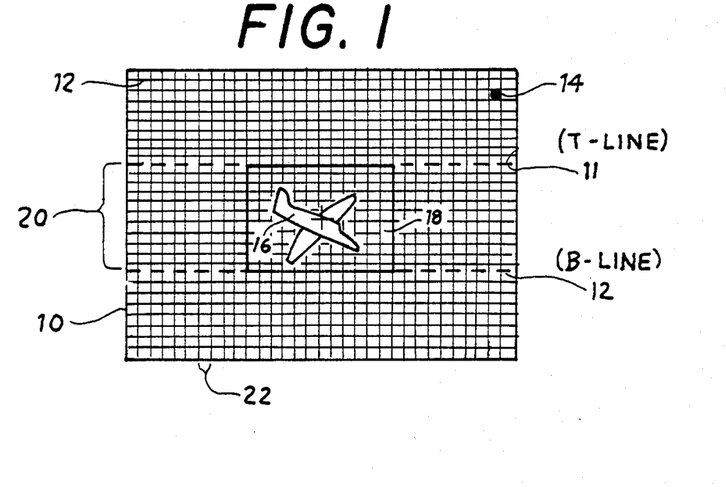
FIG. 1 is a simplified representation of a TV frame showing scanning lines, pixels, a tracking window, a target being tracked and a stripping time.

Each pixel 14 is assumed to occur in a time slot, indicated by the vertical lines 22, with the number of slots 22 equal to the number of pixels 14 per horizontal line 12. A moving target 16 is also shown in FIG. 1 and is assumed to be in the process of being tracked. A tracking window 18 is centered on target 16 and is controlled by a tracking system to maintain the TV camera aimed at target 16.

In the present invention, a horizontal scan line 12 forming the top of the window 18 is designated as T-line 11 and another horizontal line 12 forming the bottom of the window 18 is designated as B-line 13. The area between T-line 11 and B-line 13 is referred to as the stripping time 20.

Figure 2:
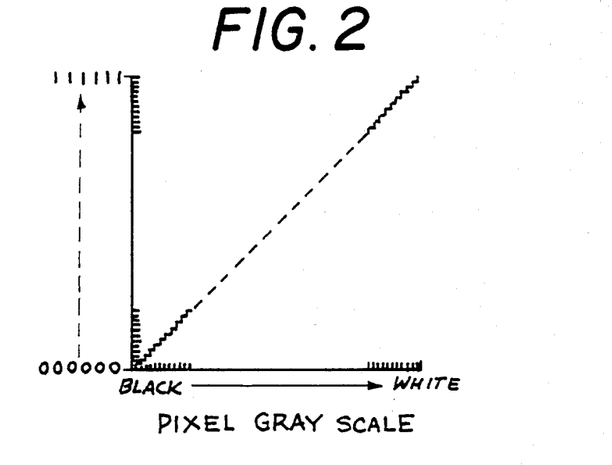
FIG. 2 shows a transfer function for a 64 tone gray scale to provide a 6-bit byte digital code.

As is common in a black and white or a color TV system, each pixel 14 will have a gray or hue value between pure black and pure white. The output from a standard TV camera will therefore be a sequence of analog waveforms for each field with the amplitude during each pixel time slot 22 being representative of the gray scale value of that point in the scene. As will be described in more detail below, each waveform representing a horizontal scan line 12 will have the amplitude of each pixel quantized and converted to a digital word or byte indicative of such amplitude. Referring to FIG. 2, a typical transfer function for a pixel gray scale is shown. Each pixel value for a scale of 64 levels is represented by a 6-bit byte with 000000 representing pure black and 111111 indicating pure white.

Figure 3:
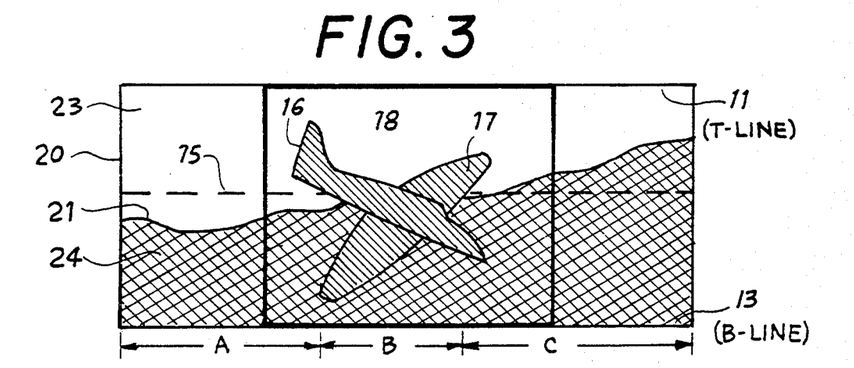
FIG. 3 is a view of a target against a dark and light background shown during the stripping time of a TV frame.

In FIG. 3, the stripping time 20 portion of FIG. 1 is shown and will be utilized below in describing the background removal system of the invention. Target 16 is assumed to be moving against a simplified background consisting of an upper portion 23 and a lower portion 21. Upper portion 23 is light in tone and assumed uniform while lower portion 21 is very dark as indicated by cross-hatching 24. Target 16 is a medium gray between dark tone 21 and light tone 23, as indicated by diagonal hatching 17. It is to be noted that all pixels in T-line 11 will have the tone value 23 and all pixels in B-line 13 will have the tone value 21 in this example.

A typical scanning line 15 within stripping time 20 is shown which scans upper background 23 during scan period A, the target during scan period B, and lower background 21 during scan period C.

Figure 4:
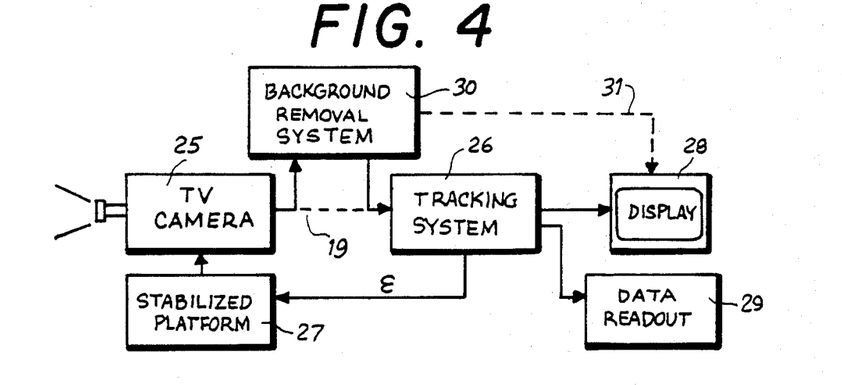
FIG. 4 is a greatly simplified block diagram of a typical target tracking system showing the location in the system of the background removal system in accordance with the invention.

Turning now to FIG. 4, a simplified block diagram of the background removal system 30 of the invention is shown in connection with a typical prior art optical tracking system. A TV camera 25, normally connected by lead 19 to tracking system 26, now feeds an analog video signal to background removal system 30 which operates to eliminate contrast between a target being tracked and the background as a parameter by removing the background and presenting tracking system 26 only with target information. The modified output video signals, which are presented as a serial digital bit stream, drive tracking system 26 which generates the necessary tracking control signals to stabilized platform 27 to maintain camera 25 with tracking window 18 centered on the target.

Although FIG. 4 shows a tracking system suitable for a ground based or vehicular based installation which produces bearing and velocity data, the invention is equally suited to use in missile guidance systems in which the output of tracking system 26 is utilized to maintain the missile on a trajectory to the target.

Figure 5:
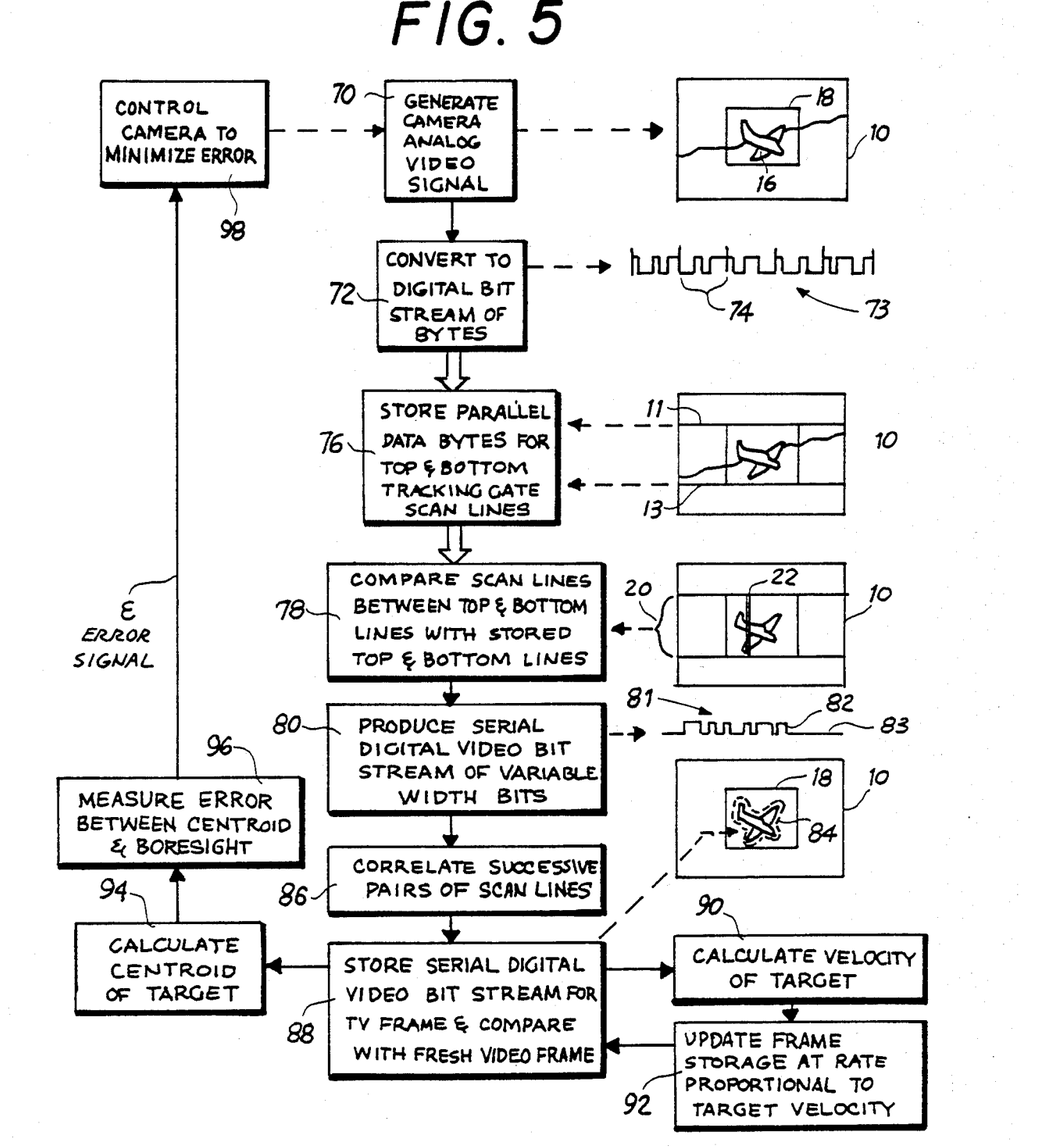
FIG. 5 is a flow diagram of the method implemented by the background removal system of the invention.

FIG. 5 provides a simplified flow diagram of the steps of the method utilized by background removal system 30 of FIG. 4. Referring to block 70, TV camera 25 of FIG. 4 generates an analog video signal which is input to system 30. Display 28 produces the exemplary TV frame 10 with tracking window 18 and target 16. The analog signal is converted, as shown at 72, to a digital bit stream 73 having six bits per byte 74 as indicated. Each byte 74 can define 64 gray levels as shown in FIG. 2.

Next, the scan line 11 representing the top of window 18 is selected in each sequential field and temporarily stored in a top line memory. Similarly, scan line 13, the bottom of window 18, is selected and stored. The top line and bottom line memories are refreshed by each successive field.

A comparison is made between the two stored scan lines and each line in the stripping time 20 as indicated in block 78. This comparison is between each pixel in the stored lines and the corresponding pixel in the stripping time lines, for example, in time slot 22. The comparison action effectively converts the stream 73 of bytes 74 to a serial bit stream 81 which comprises a ZERO base line 83 and a group of ONEs 82 of varying width. Advantageously, the ONEs occur only for the portion of a scan line which falls on the target 16. As may be understood, the background is thus represented by the ZERO base line.

By virtue of the above described functions, it may be seen that the serial digital bit stream can be applied to the tracking system without having background signals causing loss of track. However, due to both camera noise and random background disturbances, some additional operations are desirable before utilizing the pattern of the bit stream for tracking. To that end, it is advantageous to correlate successive pairs of the digital bit stream representation of the scan lines as in block 86. When any ONEs 82 are caused by noise or random disturbances, these are eliminated by such correlation.

The information from the 2-line correlation is stored in a frame memory which is used to compare an earlier frame with a current frame and to reject non-target information. In effect, a new window 84 is produced, outlining the target area.

To develop the error system for control of the tracking servo system, the centroid of the target for each frame is to be calculated. The centroid is then calculated (94) and the error between this centroid and camera boresight is measured as shown by block 96 thereby generating an error control signal.

The error control signal is applied to the tracking system which adjusts the camera to cause the boresight to approximately coincide with the target centroid; see block 98.

It may be recognized that the process described above essentially discriminates between the target and the background by virtue of the target movement. When a target is moving very slowly, portions of the target may be dropped out of the serial bit stream, causing the target to gradually fade out. This effect may be counterd by storing a TV frame as required in block 88 and maintaining that frame until the target has moved sufficiently to require updating of the storage. As shown by blocks 90,92, this is accomplished by calculating the target velocity from the magnitude of the error signal. The frame update rate is then controlled at a rate proportional to the target velocity.

Figure 6:
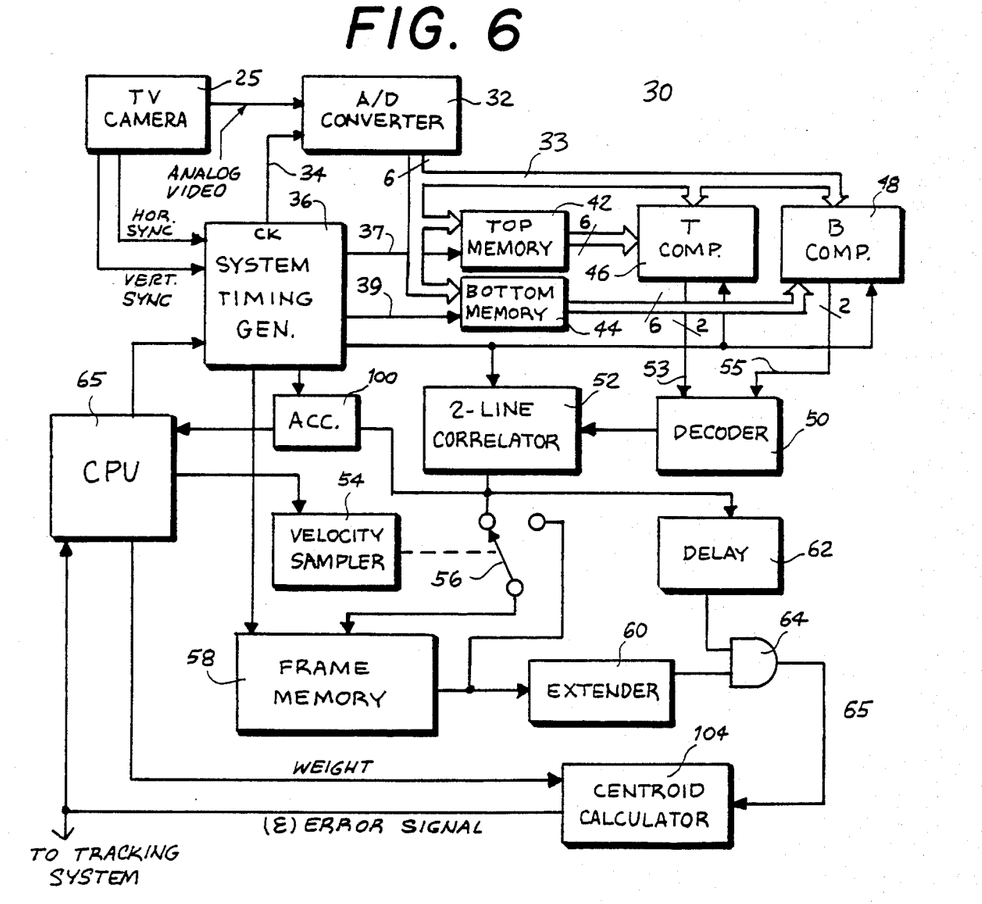
FIG. 6 is a simplified block diagram of apparatus for implementing the method described with regard to FIG. 5.

Having described the steps of processing analog video signals to provide the improved tracking system of the invention, the preferred embodiment will be explained. FIG. 6 presents a simplified block diagram of that embodiment. An A/D converter 32 converts the analog video signal from TV camera 25 to a digital bit stream comprising a sequence of parallel 6-bit bytes on bus 33. Clock is provided to converter 32 via lead 34 from system timing generator 36 which receives horizontal and vertical sync signals from camera 25.

It is assumed that the tracking system with which the system 30 is associated produces a tracking window 18 as earlier discussed. For each field of the TV signal, the horizontal scan line representing the top of tracking window 18 is stored in read/write top memory 42. The line is selected by timing generator 36 via lead 37. In the same manner, the horizontal scan line representative of the bottom of window 18 is selected via lead 39 and stored in read/write bottom memory 44.

Each horizontal scan line between such top line and such bottom line is compared to the stored top and bottom lines in T-comparator 46 and B-comparator 48. Starting with T-line 11, (see FIG. 1) each 6-bit byte of the horizontal scan lines is fed to T-comparator 46 and B-comparator 48 simultaneously in parallel via bus 33. At the same time, the corresponding 6-bit bytes stored in top memory 42 and bottom memory 44 are read out in parallel to the respective comparators 46, 48. The outputs of comparators 46, 48 on leads 53, 55 are serial variable-width digital bit streams; thus, the 6-bit byte parallel digital bit streams from A/D converter 32 which define all pixels in a TV field as one of 64 gray levels are converted to a serial bit stream having only two levels. Advantageously, one level defines a target and the other level, the background.

The logic used by comparators 46, 48 requires that only information that is different from the stored pixels be passed. Thus, if a pixel is larger than either top or bottom stored pixel, the output will be a ONE; if smaller, the output will be a ZERO. The outputs on leads 53, 55 are fed to decoder 50.

Figure 7:
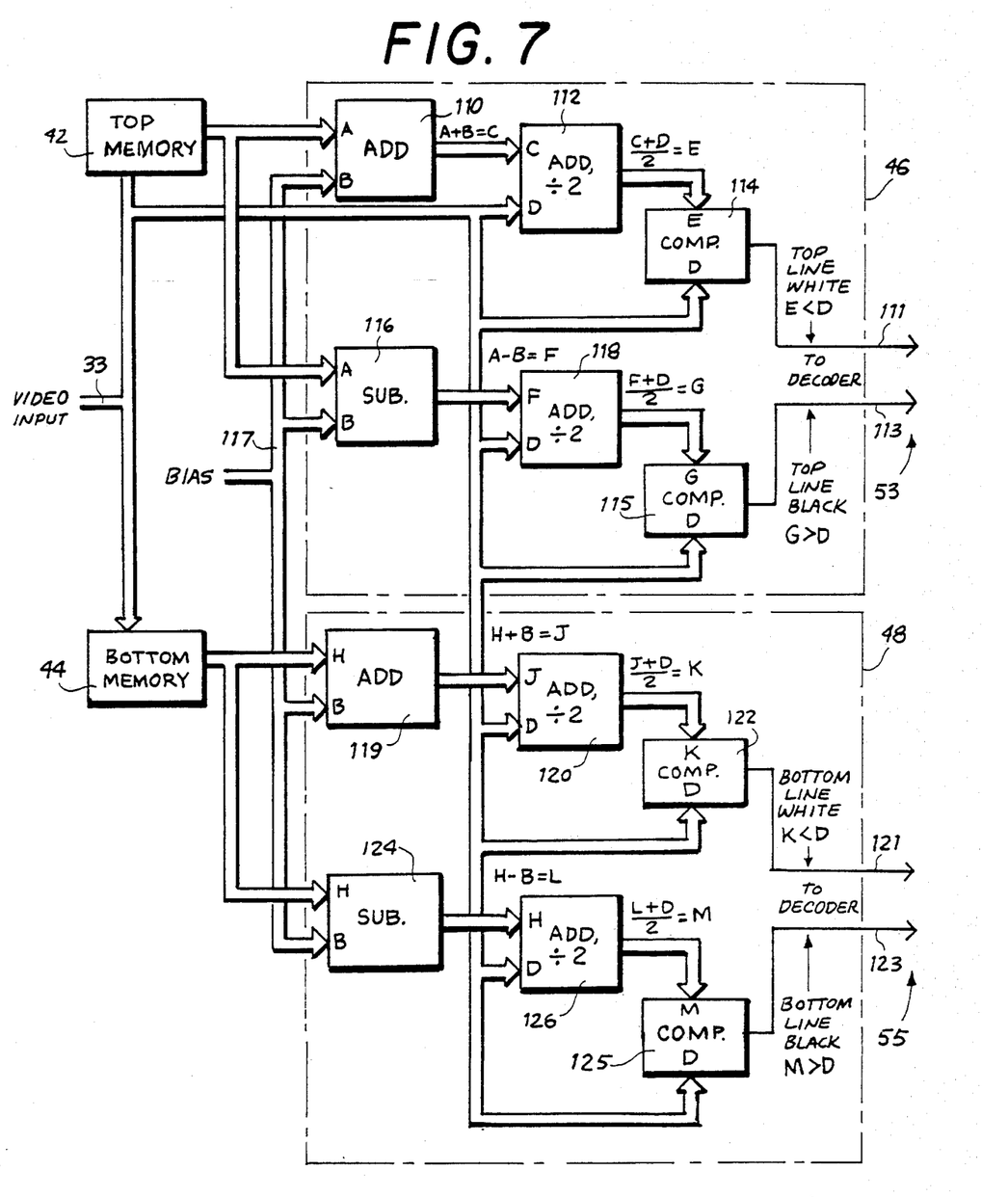
FIG. 7 is a block diagram of the top line comparator and bottom line comparator shown in FIG. 6.

Referring to FIG. 7, a detailed diagram of the comparators 46, 48 is shown. Before making the required comparisons between the top and bottom lines stored in memories 42, 44, it is necessary to add a bias to the values of each pixel in those lines to overcome camera noise which could produce random inequalities between otherwise equal levels. For example, manually adjustable bias, expressed as a 6-bit byte, is applied by bias bus 117 to input B of adder 110. The sequence of stored bytes in top memory 42 is read out to input A of adder 110. Thus, the sum of bias B and signal A is input to C of add-divide element 112. Simultaneously, bias B is subtracted from signal A in subtracter 116. Thus, a level is produced slightly above the stored signal and a level slightly below. The same process is accomplished for comparator 48 by adder 118 and subtracter 124.

Next, the sum A+B is added to the digital bytes being received via bus 33 in adder-divider 112 and to the difference A−B in adder-divider 118. These steps permit the comparison of each pixel of each input video line to the corresponding pixel of the stored top line. The corresponding connections to adder-dividers 120 and 126 permit similar comparisons to be made in comparator 48.

For the top memory 42, the comparisons are made in comparator 114 and comparator 115. When a pixel E applied to comparator 114 is less than the pixel D of the incoming video signal, a ONE will appear on output lead 111; otherwise a ZERO occurs. When pixel G is greater than pixel D, a ONE appears on lead 113; otherwise a ZERO occurs. It is to be noted that elements 112 and 118 divide their respective sums by two. This effectively permits the composite of video signal D and the stored signal modified by bias B to be returned to the original level to allow comparison with video signal D. It will be understood that the circuits in comparator 48 operate in a similar manner. Output leads 111 and 113, which make up 2-wire lead 53 are connected to decoder 50 as are output leads 121 and 123 which make up 2-wire lead 55.

Figures 8, 9, 10, 15:
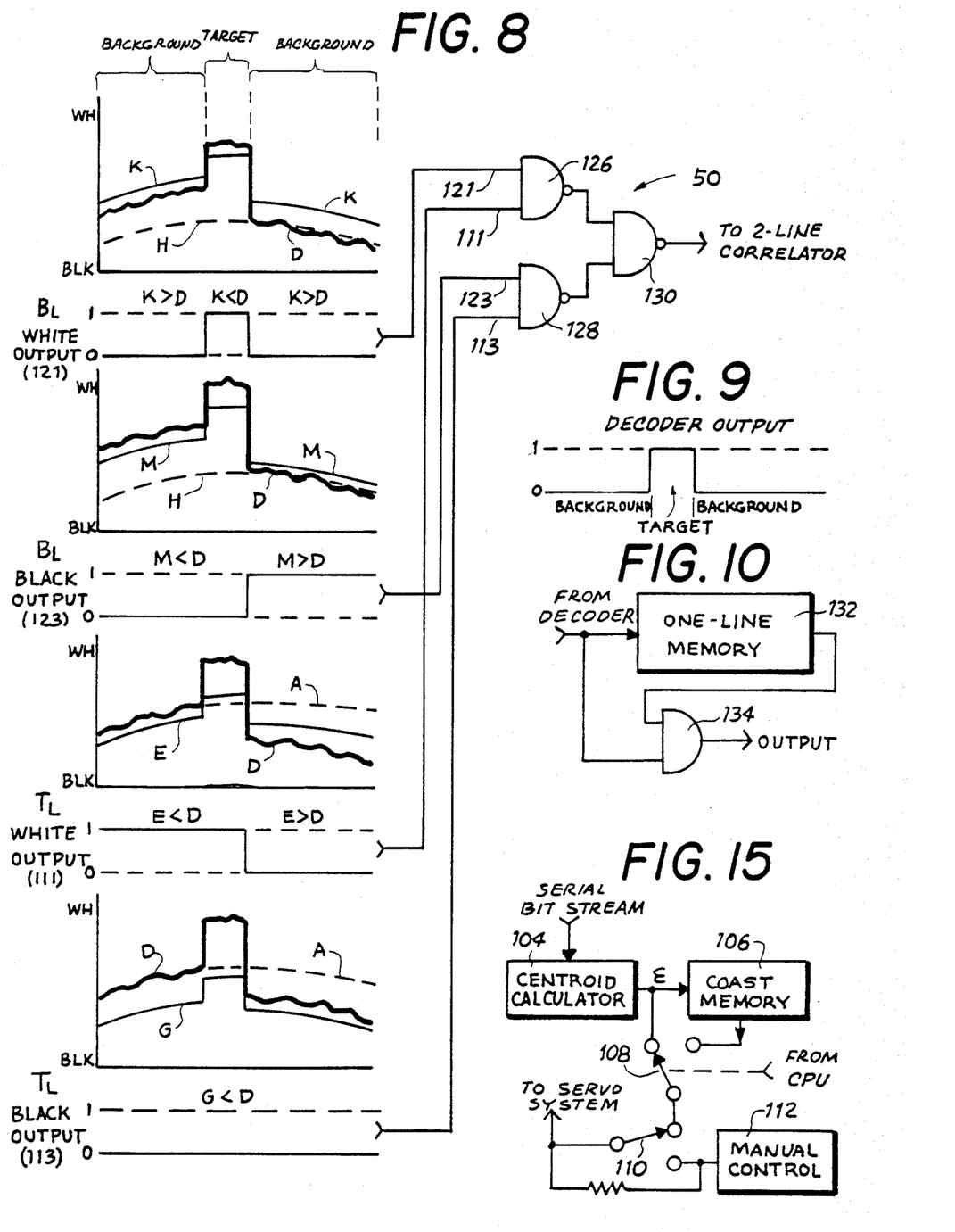
FIG. 8 is a diagram of the decoder of FIG. 6 showing associated waveforms in the circuit of FIG. 7 which produces signals feeding the decoder.
FIG. 9 is the output of the decoder of FIG. 8 for the specific example shown in FIG. 8.
FIG. 10 is a diagram of the two line correlator of FIG. 6.
FIG. 15 is a diagram of a coast memory system for minimizing the effect of a bogey in the tracking window.

FIG. 8 shows the circuit of decoder 50 and also explains more fully the use of bias and the comparison operations. A circuit diagram of the decoder 50 of the invention along with a set of waveform diagrams representative of one scanning line such as scanning line 15 of FIG. 3 is presented. It will be noted that decoder 50 comprises three NAND gates 126, 128 and 130. Inputs to gate 126 are provided by lead 121 from bottom line comparator 48 of FIG. 7 and lead 111 from top line comparator 46 of FIG. 7. Gate 128 has inputs from lead 123 of bottom line comparator 48 and lead 113 from top line comparator 46.

Utilizing the waveforms shown, the operation of the comparators 46 and 48 of FIG. 7 and decoder 50 will be explained. It is assumed that waveform D is a result of an active horizontal scan line between top line 11 and bottom line 13 for a typical light tone target against a background having varying gray levels. Thus, scan line D, which includes camera and other system noise, produces a varying and increasing signal which would be changing from a dark gray to a lighter gray. At the point the scanning line crosses the target there is a sudden increase in the signal, indicating a much lighter level for the target. As this scanning line leaves the target, it drops back to the background level which is a much darker area and which becomes increasingly dark to the end of the scan. The first waveform shown refers to the waveform on bus D in comparator 48 and in which the stored bottom line is indicated by the dashed line H which is assumed for purposes of illustration to have essentially the same tonality as the background of the target. Waveform K is a smooth representation of the addition of bias to waveform H, the addition of waveform D to that sum and division by two to thereby produce waveform K. Waveform K is compared in comparator 122 of FIG. 7 such as to produce pure white or a ONE output when K is less than D and to produce or ZERO when K is greater than D. Therefore, the output on lead 121 would be as shown on the output waveform plot. Referring now to the third waveform plot which shows the output on lead 111 as a result of operation on waveform D by comparator 46. A similar analysis as just applied to the first waveform plot may be applied in this instance. It is therefore to be seen that when E is less than D, a white output or ONE, will be produced on lead 111 and a ZERO will be produced when E is greater than D.

Following the same analysis, the black output lead 123 for the bottom line comparator 48 and black output lead 113 for the top line comparator 46 will be seen to produce respectively a ZERO when M is less than D, a ONE when M is greater than D and a ZERO when G is less that D.

The NAND gate 126 and 128 produce a ONE output for all combinations of inputs, except when both inputs are ONEs in which case a ZERO is obtained. Thus, for the indicated logic levels on leads 121, 123, 111 and 113, the output shown in FIG. 9 will occur from gate 130 in which the background is ZERO and the target is ONE.

Figures 12, 13, 14:
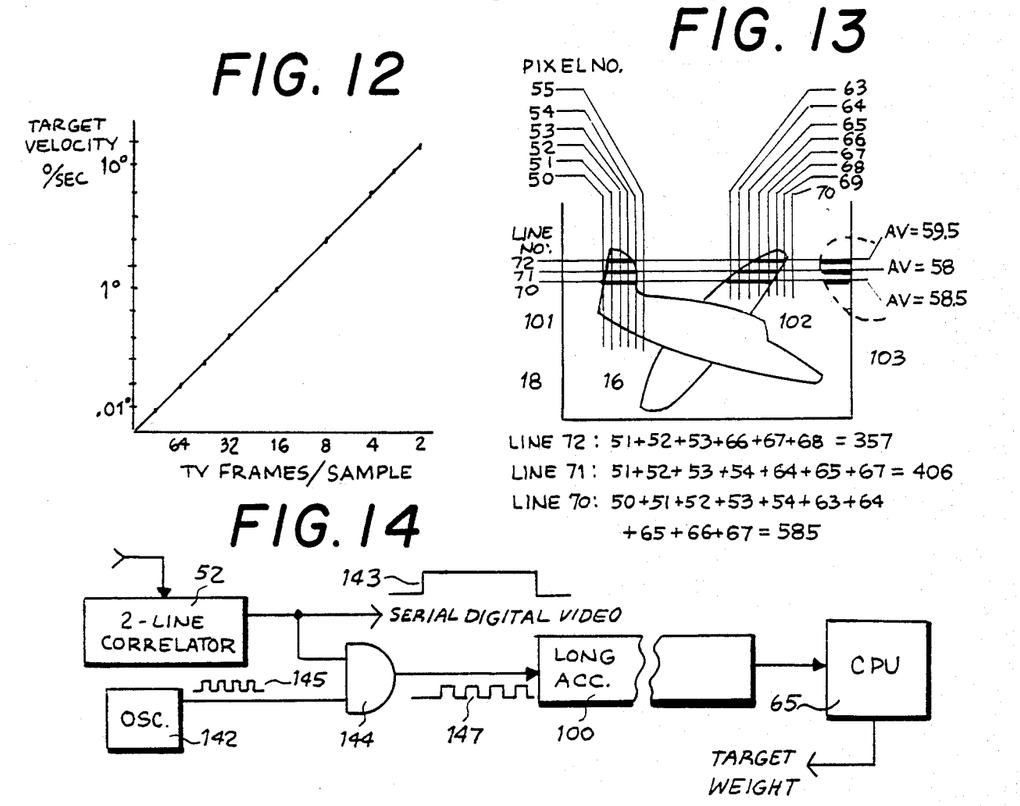
FIG. 12 is a typical plot showing a specific set of numbers of TV frames per sample as a function of target velocity applicable to the velocity sampler of FIG. 11.
FIG. 13 is a diagram showing a target window with a target located therein and the identification of the method of calculating the weight of the target.
FIG. 14 is a diagram of the accumulator system of FIG. 6 for calculating target weight.

Referring to FIG. 13, the decoder output for line 72 would be seen to have a ZERO base line with a ONE having a width equal to two pixels, defining a scan 72 across the tail section and another ONE having the width equivalent to three pixels for the portion of scan 72 across the wingtip. As a result of scanning an entire frame, it can be now seen that such frame would be representative of a pure white aircraft on a pure black background thereby providing the tracking system with ideal target information. In practice, it will be understood that on display 28 of FIG. 4, the operator will see the actual scene produced by TV camera 25. However, in accordance with the invention, the serial digital bit stream representation of each scanning line such as that shown in FIG. 9 is connected to the display as indicated by dashed line 31 and synchronized to overlay the target when the system acquires. Therefore, the operator will immediately see the effects of the target discrimination provided by the present invention. Further, this feature permits the operator to adjust bias on bus 117 of FIG. 7 during the acquisition phase of a target. If a target has high contrast and is producing an original clear signal, only a minimum bias is required since camera noise and the like may be overridden. However, if a weak target is being sought, the bias must be great enough to prevent noise from producing false targets. Once a target is acquired, the bias is reduced to a level just above that of the camera systlem noise. This action disregards target contrast and the comparison considers only pattern. As will be understood, the operation in adder-divider 112 and adder-divider 120 serves as a form of automatic bias control to always maintain the optimum signal sensitivity condition.

In the diagram of FIG. 6, decoder 50 produces a continuous serial bit stream output, having a ZERO base line and variable width ONEs representing portions of the target.

Although the actions of the comparators 46 and 48 tend to reduce false ONEs due to noise, an occasional noise spike can occur. Therefore a two line correlator 52 is provided having the circuits shown in FIG. 10. Each scan line from decoder 50 is read into a one line memory 132 and to one input of AND gate 134. The other input of gate 134 is the output from one line memory 132. Thus, any portion of ONE appearing in one line that does not appear in the next line is rejected in the correlator output. Advantageously, this eliminates any ONE produced by noise.

The output from two line correlator 52 is fed to switch 56. In the position of switch 56 of FIG. 6, the correlator output feeds frame memory 58. Under control of the system timing generator 36, a complete frame formed by two inter-laced fields is stored in frame memory 58. A stored frame is then read out of frame memory 58 via extender 60 to AND gate 64. The other input to AND gate 64 is from delay 62 fed directly from two line correlator 52. The operation of this portion of the system is shown more clearly in FIG. 11. Extender 60 comprises one shot 136, inverter 138 and AND gate 140. Assume that, for a particular line stored in frame memory 58, the corresponding line in the next frame has the same value and includes a ONE 133 as shown on line A. When ONE 133 is read out of frame memory 58, it triggers ONE shot 136 which combined with the output from inverter 138 produces the level shown in line C which represents the original signal 133 extended by means of the ONE shot 136 by the extension 135. The A waveform in the meantime has been applied to delay line 62 which delays ONE 133 approximately one half of the duration of the one shot output pulse, and the output B is input to AND gate 64. Therefore, the coincidence of the waveform on line B and line C produce an output equal in width to the original ONE 133 as indicated on the output line.

Figure 11:
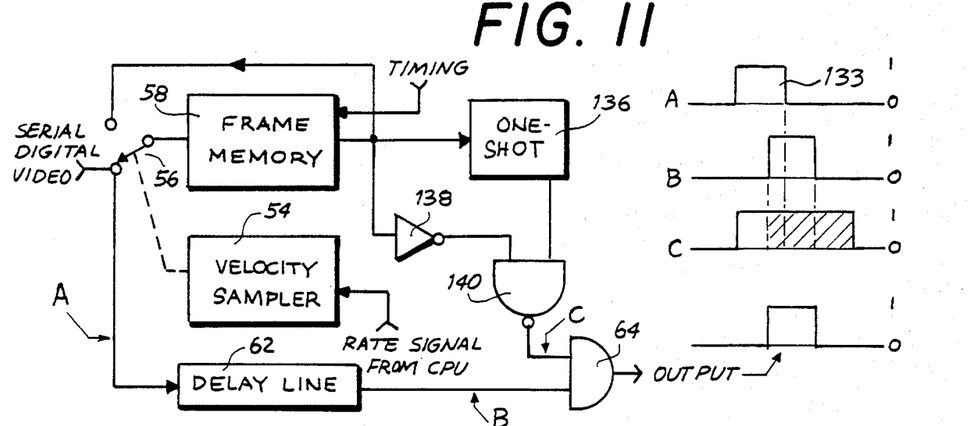
FIG. 11 is a more detailed diagram of the frame memory and the extender of FIG. 6 including waveforms showing the operation thereof.

As may now be recognized, a serial digital video output signal will occur on lead 65 having a ZERO level representative of target background and a ONE level representative of the target. This signal is applied to centroid calculator 104. Centroid calculator 104 determines the location of the centroid of the target defined by the digital video bit stream. The CPU 65 is programmed to calculate the tracking error from boresite data obtained from the associated tracking system and therefore produces an error signal to be utilized by the tracking system which adjusts the stabilized platform to reduce the error toward ZERO.

As previously discussed, the velocity of the target affects the operation of the invention since a very slowly moving target is difficult to discriminate against a stationary background. To improve this situation, the relative velocity of the target is determined in the CPU 65 by measurement of the steady state tracking error. The slower the target is moving, the less the tracking error will be. Thus, the magnitude of the error provides velocity data. The velocity information obtained from the steady state tracking error is utilized to control velocity sampler 54. Thus, a sampling rate control signal is developed by the CPU 65 which causes velocity sampler 54 to operate switch 56 disconnecting frame memory 58 from the serial digital video stream out of two line correlator 52. In its operated position, switch 56 recirculates the output from frame memory 58 back to the input. Therefore, for the period during which switch 56 is operated, the same stored frame is used to develop the output on lead 65. For example, for a very slow moving target, switch 56 may remain closed for a period equivalent to 64 frames and for a much higher velocity target, switch 56 may remain closed for four frames. Thus, velocity sampler 54 will control the updating rate of frame memory 58. FIG. 12 is an exemplary plot showing the number of TV frames per sample for specific target velocities. It is to be understood that this information would be determined by the dynamics of the specific system.

The CPU 65 is required to calculate the weight of the target within the tracking window. This information is utilized, for example, in determining the target centroid. Referring now to FIG. 13, the basic approach to weight calculations is shown. For reference, each scanning line in the target window is identified by a line number and each pixel in a horizontal line is identified by a pixel number. Using the target 16 as an example, the weights shown for lines 70, 71 and 72 are calculated. In addition, the effect of a "bogey" 103 will later be discussed. However, bogey 103 is ignored in the present discussion. For purposes of example, pixel numbers 50 through 55 and 63 through 69 are illustrated. It is to be understood that both the line spacing and pixel spacing are greatly exaggerated for clarity. Starting with line 72, the pixel numbers falling within the area of target 16, which are for tail section 101 and wing section 102, are summed and averaged. This process is repeated for the three lines shown. Thus the average of line 72 is 59.5, of line 71 is 58, and of line 70 is 58.5. When this process is repeated for the entire target, the averages may be summed and averaged, producing a target weight number. If, for example, the average of the entire tracking window were 400 and the average for the target were 100, a 1 to 4 target ratio would be obtained.

To permit the above required calculations to be made, the circuit of FIG. 14 is used. Since the output of two line correlator 52 is a sequence of varying width ONEs, such for example as shown at 143, it is necessary to clock the wide pulses to be able to count pixels. Therefore, an oscillator 142 is provided which may be contained in system timing generator 36, and produces a square wave output 145 at the pixel rate. The oscillator signal and the serial digital video pulses such as 143 are fed to inputs of AND gate 144 which will convert pulse 143 to interrupted pulse 147. The interrupted pulses 147 are supplied to a long accumulator 146 capable of accumulating the pixels in a scanning line for tracking window 18. Thus, the CPU is provided with the count of the number of target pixels in each line.

In addition to using this information for calculation of the centroid of the target, it is also useful to eliminate problems of a bogey appearing in the field of view of the TV camera. As noted in FIG. 13, a bogey 103 is shown just entering the right edge of tracking window 18. Generally, bogey 103 would move with respect to target 116 and would eventually exit the tracking window. However, during its residence within the tracking window, bogey 103 would change the weight ratio as well as the calculated centroid of the target, all of which would introduce tracking errors and could in some instances cause loss of lock. To prevent this from happening, a coast memory 106 is provided as shown in FIG. 15. A coast memory switch 108 would normally be in the position shown which directs the error signal via switch 110 to the servo system. The error signal is indicative of the velocity and acceleration of target 16. That error signal is stored for a selected period, which may be on the order of four seconds in some cases, in coast memory 106. Thus, at any given time, the signal stored in coast memory 106 represents the last four second history of the motion of target 16. When CPU 65 detects a sudden increase in the target weight, it controls switch 108 to switch to feed the error signal and rate of change of error signal from coast memory 106 that had occurred during the past four seconds. The assumption is made that this is sufficient time for the bogey to leave the field of view and that there would be no significant change in the velocity or acceleration of the target during this period. When switch 108 is returned to its normal position, only a relatively small tracking error will occur and the target can be quickly re-acquired. FIG. 15 also shows a manually operated switch 110 which permits manual control of the servo system for initial acquisition of a target and an isolating resistor to permit manual touch-up of the tracking, if required, during a coast memory operation in which the operator may note a greater than expected movement of the target with respect to boresight. In any event, the effect of bogey 103 is eliminated or greatly reduced.

As will now be recognized, a method and apparatus has been disclosed applicable to optical tracking system. Advantageously, the apparatus and method provides for improvement of the tracking capability by elimination of background information and enhancement of target information. Although a specific embodiment of the invention has been described herein, it will be obvious to those of ordinary skill in the art that many changes and substitutions can be made without departing from the spirit or scope of the invention.

I claim:

1. In an optical tracking system having a television camera, having an analog video signal output, said camera disposed on a stabilized platform, and a tracking system for maintaining a target against a background centered on the boresight of the camera, the method of eliminating the background from the tracking system and providing a single level signal representative of the target comprising the steps of:
   converting the analog video signal output to an n-bit per byte digital bit stream wherein each byte defines the gray level of a pixel;
   storing a first sequence of n-bit bytes representative of the pixels of a first single television scanning line near the top of the television frame;
   storing a second sequence of n-bit bytes representative of the pixels of a second single television scanning line near the bottom of the television frame;
   comparing the sequence of n-bit bytes representative of the pixels of each horizontal scan occurring between said first scanning line and said second scanning line with said stored first sequence and with said stored second sequence, such comparison producing a serial digital two-level bit stream having a ZERO base line replacing said background and a plurality of variable width ONEs representative of a target being tracked by the optical tracking system; and
   calculating an error signal between the target center and the boresight of the television camera for controlling of the tracking system.

2. The method defined in claim 1 in which said step of calculating an error signal includes the steps of:
   storing successive television frames formed by said serial digital two-level bit stream; and
   calculating the centroid of the target in said successive frames for measuring said error signal between said centroid and said boresight.

3. The method as defined in claim 2 which further comprises the steps of:
   calculating the velocity of the target being tracked;
   recirculating a stored television frame a number of times proportional to the calculated target velocity before storing a succeeding frame.

4. In an optical tracking system having a television camera disposed on a stabilized platform, and a tracking system for maintaining a target against a background centered on the boresight of said camera, apparatus for removing said background and for producing a target pattern for controlling said tracking system comprising:
   analog-to-digital converter for converting an analog video signal from said television camera to an n-bit byte digital bit stream wherein each byte is representative of one of $2^n$ gray levels;
   system timing means synchronized with said television camera;
   memory means timed by said system timing means for storing a first sequence of bytes representative of the pixels of a first horizontal scanning line near the top of the television frame, and for storing a second sequence of bytes representative of the pixels of a second horizontal scanning line near the bottom of said television frame;

first comparator means connected to said memory means for performing a first comparison of the sequence of bytes representative of the pixels of each active horizontal scan line occurring between said first stored horizontal line and said second stored horizontal line with the corresponding pixels of said stored first horizontal line and with the corresponding pixels of said second horizontal line on a pixel by pixel basis to thereby produce an output only when pixels being compared differ; and decoder means connected to said comparator means to receive a first output from said comparisons with said first stored horizontal line and a second output from said comparisons with second stored horizontal line, said decoder thereby producing a video output having a base line of one logic level when said active horizontal line pixel is representative of the background and a variable width pulse of a second logic level when said horizontal line pixel is representative of a target.

* * * * *